(12) United States Patent
Bauce

(10) Patent No.: US 7,377,532 B2
(45) Date of Patent: May 27, 2008

(54) PEDAL DRIVE SCOOTER

(76) Inventor: Giovanni Battista Bauce, c/o Bugion S.P.A. - Viale Lancetti, 17 20158 Milano (IT)

( * ) Notice: Subject to any disclaimer, the term of this patent is extended or adjusted under 35 U.S.C. 154(b) by 344 days.

(21) Appl. No.: 10/539,147

(22) PCT Filed: Dec. 15, 2003

(86) PCT No.: PCT/IT03/00815

§ 371 (c)(1),
(2), (4) Date: Jun. 16, 2005

(87) PCT Pub. No.: WO2004/056647

PCT Pub. Date: Jul. 8, 2004

(65) Prior Publication Data

US 2006/0119052 A1    Jun. 8, 2006

(30) Foreign Application Priority Data

Dec. 20, 2002 (IT) .......................... MI02A002702

(51) Int. Cl.
*B62M 1/04* (2006.01)
(52) U.S. Cl. ...................................... 280/221; 280/253
(58) Field of Classification Search ................ 280/221, 280/220, 253, 252; 482/51
See application file for complete search history.

(56) References Cited

U.S. PATENT DOCUMENTS

| | | | |
|---|---|---|---|
| 1,272,761 A * | 7/1918 | Bailey | 280/221 |
| 1,653,889 A * | 12/1927 | Clark | 280/221 |
| 5,368,321 A | 11/1994 | Berman et al. | |
| 6,716,141 B2 * | 4/2004 | Bhoopathy | 482/51 |
| 6,796,570 B1 * | 9/2004 | Chang | 280/255 |
| 2003/0098566 A1 * | 5/2003 | Christensen et al. | 280/221 |
| 2007/0114749 A1 * | 5/2007 | Tal | 280/221 |

FOREIGN PATENT DOCUMENTS

| | | |
|---|---|---|
| CH | 650 458 A5 | 7/1985 |
| DE | 43 43 723 A1 | 6/1994 |
| FR | 678505 A | 3/1930 |
| WO | WO 02/30732 A1 | 4/2002 |

* cited by examiner

*Primary Examiner*—Tony Winner
(74) *Attorney, Agent, or Firm*—Pearne & Gordon LLP

(57) ABSTRACT

A vehicle and in particular a scooter in which there is present a first and a second element separated from each other and movable relative to a base frame, the elements defining respective actuating surfaces disposed substantially in side by side relationship with each other with respect to a longitudinal extension axis of the vehicle; an alternated operation of the first and second movable elements (6, 7) allows a motion-transmitting unit (8) to convert the reciprocating motion into a rotatory motion imparted to one of the scooter wheels thereby causing advancing of the vehicle. The particular positioning and configuration of the movable elements (6, 7) allows a steady and efficient use of the scooter.

8 Claims, 2 Drawing Sheets

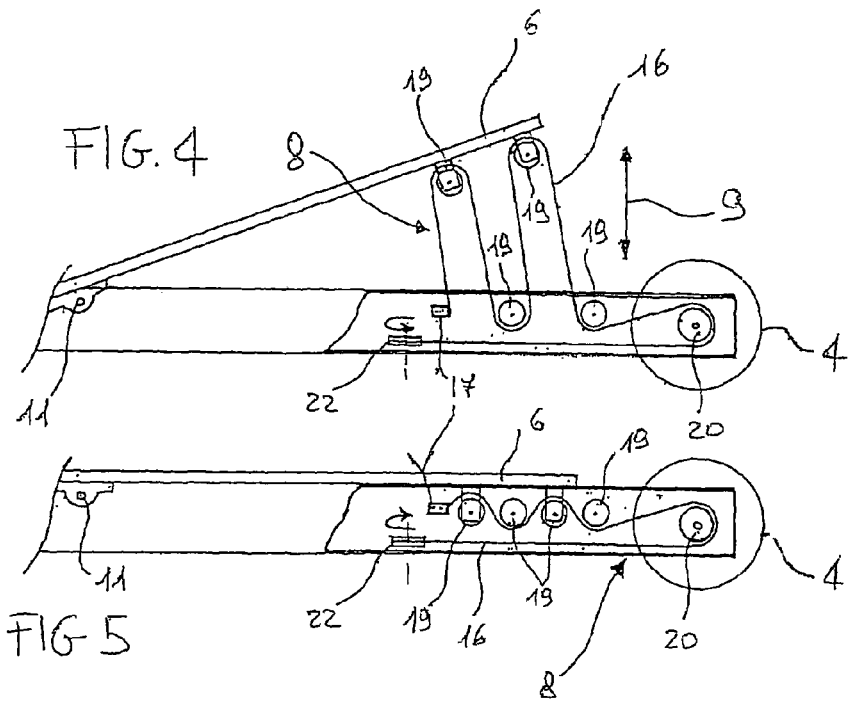
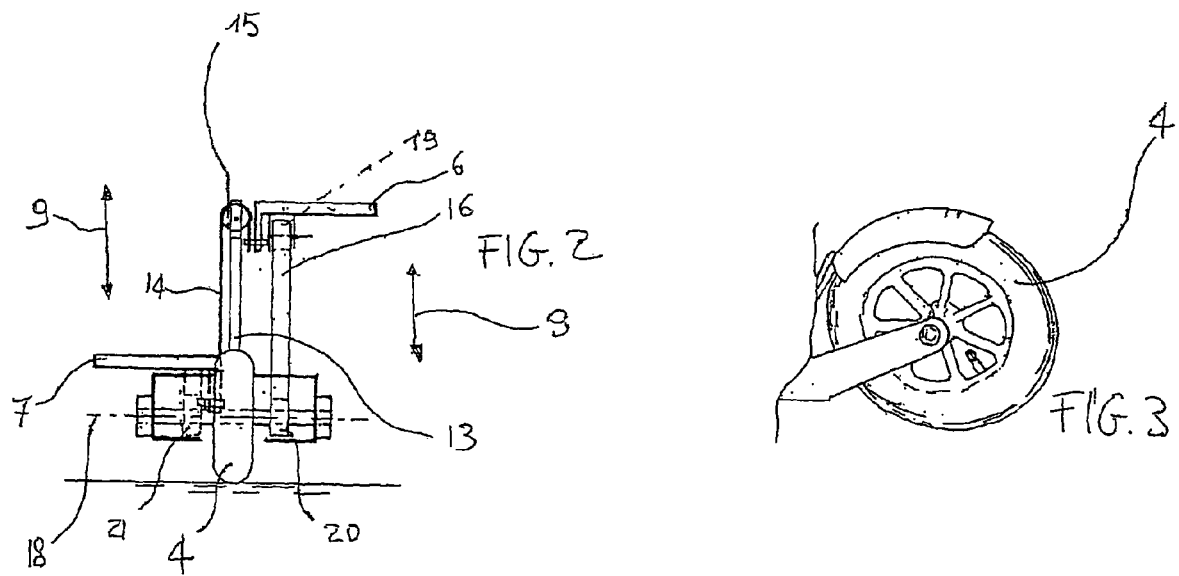

PEDAL DRIVE SCOOTER

BACKGROUND OF THE INVENTION

The present invention relates to a vehicle of a type moved by a user, such as a scooter.

1. Field of the Invention

However the subject matter of the invention can be utilised for any type of locomotion vehicle exploiting the action of an operator as the motive power.

2. Description of the Related Art

It is known that common scooters presently widely on the market consist of a base frame or board designed to support a user or rider; the frame is equipped with a first and second wheel rotatably in engagement with said frame in such a manner as to enable movement of the scooter itself.

The structures of known type are then provided with an appropriate steering handlebar to enable the scooter to cover curved trajectories.

As regards movement, a scooter is pushed by the rider that puts one foot on the frame and pushes against the ground with the other foot giving it an advancing movement.

In addition to the above described and well known type of scooter, scooters provided with additional features have become available in recent times.

In a first type of these scooters use of an appropriate movement unit mounted on the fixed frame is provided that offers the rider the possibility of imparting an advancing movement to the scooter without pushing against the ground with one foot. In other words, the scooter is equipped with a suitable pedal to be pushed by the rider's foot for operation; the pedal is oscillatable in an alternated manner around a fulcrum and adapted to operate a movement unit capable of converting the oscillatory movement into a continuous rotatory movement directly imparted to the rear wheel. This means that the rider is able to impart an appropriate forward thrust to the scooter by moving the pedal with a single leg.

This type of scooter has had a further development involving association of a rocking lever with the support frame, said rocking lever being made of one piece construction and extending over the whole longitudinal length of the support surface of the scooter. The rocking lever is hinged in the middle on the support frame and can be oscillated around this axis.

In particular, a user riding a scooter and having one foot in correspondence with the front wheel and the other foot in correspondence with the rear wheel alternately moves his/her weight to and fro thereby causing the rocking lever to oscillate.

Linked to this rocking lever is a chain that through appropriate intermediate members, imparts a continuous rotatory motion to the rear wheel.

Therefore, this type of scooter too is able to allow movement of the vehicle without the rider being-obliged to push against the ground with one foot.

While the above described known scooters have been hitherto on the market, they however have some drawbacks and/or limits in operation.

In fact devices having means for motion generation on board are often of uncomfortable use. In fact, in the scooters provided with a driving pedal the same leg is always to be used to supply the required energy for motion.

If the rider is tired to use one foot for driving the scooter, use of the other foot is substantially impossible; in addition, to enable the scooter to advance to a convenient speed, the pedal must be operated over a long path stretch. This obviously gives rise to an uncomfortable position in addition to a considerable effort for operation.

With reference to the above described third type of scooter that is provided with an oscillatable rocking lever, it is to be pointed out that the particular arrangement of the plate necessarily involves an uncomfortable position for the rider driving the motion-transmitting unit. In fact the user rides the scooter with one foot at a position greatly advanced towards the front wheel and the other foot at a backward position, close to the rear wheel. In addition, the two feet are at different heights so that the rider's comfort is further reduced.

Finally, in order to obtain a good advancing, big travels of the oscillating end portions are required and said portions must have a suitable distance from the fulcrum. For the above reason a rider must alternately move his/her weight backward and forward, taking into account the fact that the rider's fully backward position is not only uncomfortable but also much less steady than in conventional scooters devoid of driving units.

It is also to be pointed out that in the presence of potholes or debris, positioning of the overall (scooter and rider) centre of gravity is of a fundamental importance to ensure an optimal steadiness and roadholding of the vehicle, which feature is not present in the above described scooters.

SUMMARY OF THE INVENTION

Accordingly, it is an object of the present invention to substantially solve all the mentioned drawbacks.

It is a first aim of the invention to make available a vehicle, in particular a scooter, that can combine optimal features in terms of steadiness in motion with a good comfort for the rider as regards both the rider's position on the scooter and the method of driving the latter.

It is a further aim of the invention to provide a scooter enabling a great efficiency with the minimum possible driving effort for the rider.

The foregoing and further aims that will become more apparent in the course of the present description are substantially achieved by a vehicle, in particular a scooter, in accordance with the appended claims.

BRIEF DESCRIPTION OF THE DRAWINGS

Further features and advantages will be best understood from the detailed description of a preferred, but not exclusive, embodiment of the invention, with reference to the accompanying drawings, in which:

FIG. 2 is a partial view of a rear region of the scooter shown in FIG. 1;

FIG. 3 shows a possible wheel of bigger sizes than the wheel in FIG. 1 to be used in a scooter in accordance with the invention;

FIG. 4 shows a first movable element in an upward end-of-stroke position and also shows part of the motion-transmitting unit;

FIG. 5 shows the lever seen in FIG. 4 in a downward end-of-stroke position.

DETAILED DESCRIPTION OF THE PREFERRED EMBODIMENTS OF THE INVENTION

Figure 1:
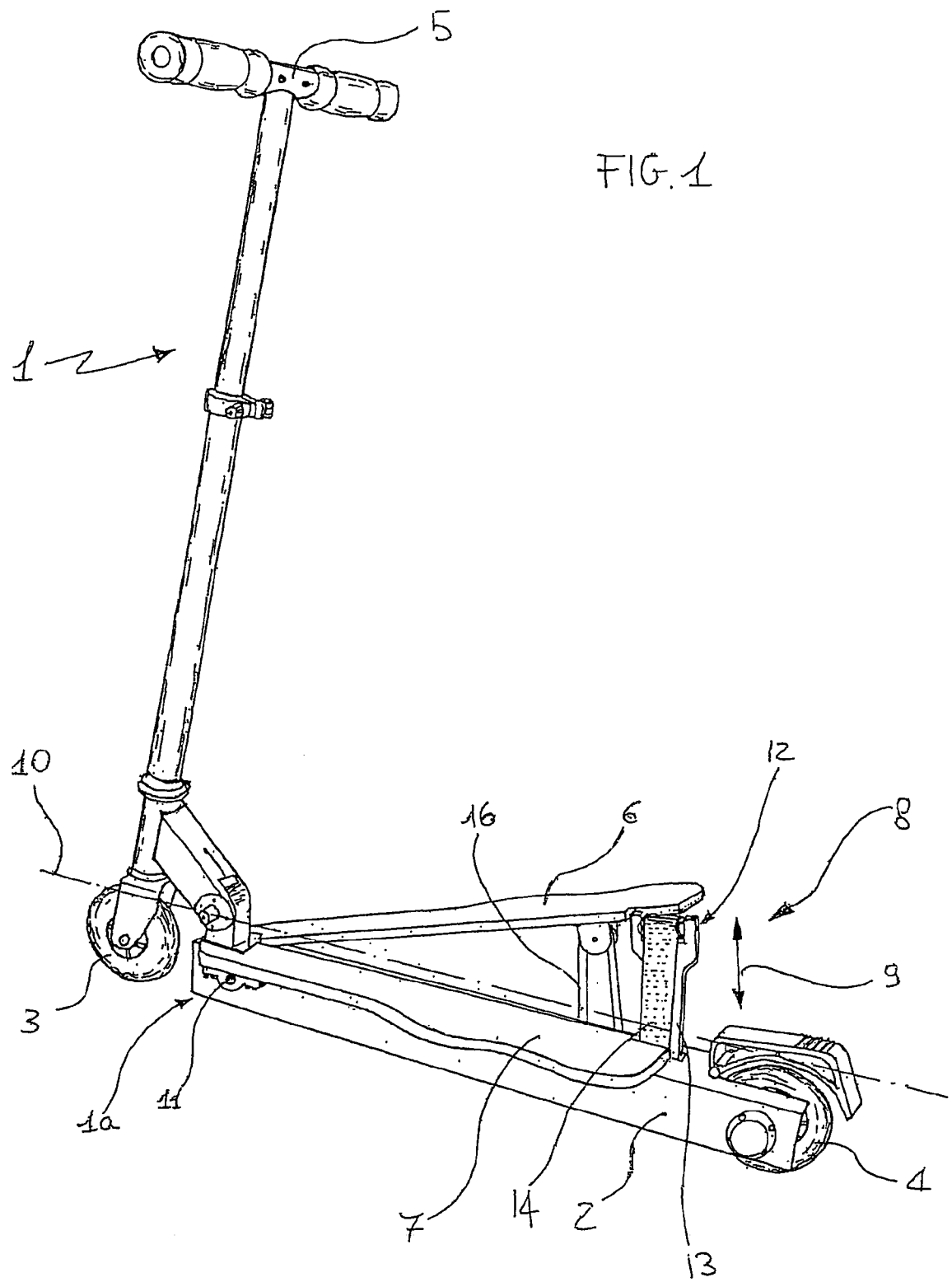
FIG. 1 is a perspective view of the vehicle in accordance with the present invention.

With reference to the drawings, a locomotion vehicle in accordance with the present invention has been generally identified by reference numeral 1.

The embodiment illustrated in FIG. 1 in particular has the shape of a traditional scooter although it has many differences therefrom, as better specified in the following.

Still with reference to FIG. 1, it is possible to see that the locomotion vehicle therein shown has the typical features of a scooter, i.e. it consists of a base frame 2 with which a first and second wheels 3, 4 free to be driven in rotation around their axis are in engagement.

Then there is the presence of a steering member or handlebar 5 set to allow engagement of the scooter by a rider through appropriate handles and also connected with the first front wheel 3 to suitably rotate the rotation axis thereof so as to enable the vehicle to travel along curved paths.

In more detail, there is also the presence of at least one first and one second movable elements or plates 6, 7; both said elements are movable relative to the base frame 2 and also active on a motion-transmitting unit 8 to enable driving in rotation of at least one of the wheels 3, 4 and consequent motion of the vehicle.

The motion-transmitting unit 8 is associated with the base frame 2 and is also designed to receive motion from said movable elements 6, 7 and transfer it to one of the two wheels 3, 4, the rear wheel 4 for example.

As viewed from FIG. 1, the first and second movable elements 6, 7 possibly are distinct elements separated from each other and they are movable in a reciprocating manner close to and away from the base frame 2 (in particular see arrow 9 in FIGS. 1, 2 and 4).

Actually, the first and second movable elements 6, 7 define respective actuating surfaces essentially disposed in side by side relationship with respect to a substantially longitudinal extension axis 10 of the vehicle.

In the embodiment shown the first and second movable elements 6, 7 are hinged on the base frame 2, at a front region 1a of the vehicle, for example.

Thanks to this configuration these elements 6, 7 alternately oscillate up and down along direction 9, around a hinging axis 11.

In particular, oscillation takes place between a point of maximum distance from the base frame 2 (or maximum travel; see the first element 6 in the position shown in FIG. 1) and a point of minimum distance from the base frame 2 (or minimum travel; see the second movable element 7 in the condition shown in FIG. 1).

The scooter also comprises synchronisation means 12 capable of suitably coupling the movements of the first and second movable plates 6, 7.

In particular, following a displacement of the first plate 6 to the position of maximum distance from the base frame 2, the second movable plate 7 takes a position of minimum distance from frame 2 (configuration shown in FIG. 1); following return of the movable element 6 towards the base frame 2, the second movable element 7 will reach its position of maximum distance from the frame itself. In other words, to the upward stop limit of one movable element corresponds the downward stop limit of the other movable element and vice versa.

To allow the above movements, said synchronisation means 12 comprises a fixed structure 13 emerging away from the base frame 2 and a deformable body 14, preferably a belt, that is movable on the fixed structure 13 and in engagement by its ends with said first and second movable elements 6, 7.

In detail, there is the presence of a roller 15 idly mounted on the fixed structure 13 and over which belt 14 can run.

Looking at FIG. 2, it is clearly apparent how the movement synchronisation of the first and second movable elements 6, 7 takes place.

In particular a downward displacement of the movable plate 6 along direction 9 involves a rotation of roller 15, the movable element 7 being correspondingly driven upward by belt 14.

In addition, still looking at FIGS. 1 and 2, it is possible to see that the movable elements 6, 7 are defined by elongated plates disposed in mutual side by side relationship along the longitudinal vehicle axis 10.

In particular said plates exactly define the support surfaces designed to receive the rider's respective feet and actually said rider can stand on the scooter keeping his/her legs and feet close to each other in side by side relationship, that is in a substantially steady and comfortable position.

The motion-transmitting unit 8 is now examined. It is to be pointed out first of all that it is able to convert the reciprocating motion of the movable plates 6, 7 into a rotatory motion applied to the second wheel 4.

To enable this conversion the motion-transmitting unit 8 first of all comprises at least one deformable element 16 that can be for example a belt, a chain, or other similar element directly in engagement. (see reference 17 in FIG. 4) with the first and second movable elements 6, 7 and also active at a rotation axis 18 of the second wheel 4.

Also present is a given number of intermediate members 19 (sheaves or pulleys for example) that are associated both with the movable elements 6, 7 and with the base frame 21 and allow a sliding movement of the deformable element 16 over them, as better specified in the following.

The motion-transmitting unit 8 is also equipped with two further free wheels 20, 21 preferably fitted on the axis 18 of the second wheel 4 to transfer the motion received through the deformable element 16 to the second wheel 4 in an alternated manner.

In detail as regards construction, there will be the presence of at least one and preferably two intermediate members 19 for each movable element 6, 7 and at least one and preferably two intermediate members 19 for each side (corresponding to each movable element 6, 7) disposed on the base frame 2 (see the right-hand frame half shown in FIGS. 4 and 5).

Finally, the motion-transmitting unit 8 comprises a further intermediate member 22 (shown in FIGS. 4 and 5) that is disposed horizontally to allow motion of the deformable element 16 between the first and second movable elements 6, 7.

After the above statements from a structural point of view, operation of the vehicle in accordance with the invention is as follows.

The rider gets on the scooter placing one foot on the movable plate 6 and the other foot on the movable plate 7 in side by side relationship and close to the rear region of the scooter itself.

Then the rider starts moving his/her weight on the left leg and right leg in an alternated manner so as to impart an alternated oscillatory motion to plates 6, 7 around the hinging axis 11.

Correspondingly, through the synchronisation means 12, motion of plates 6, 7 is maintained synchronised because belt 14 allows a downward motion of a first one of said plates simultaneously with an upward motion of the other plate and vice versa.

During this reciprocating motion, and in particular during the upward motion, illustrated in the passage of configuration from FIG. 5 to FIG. 4 for example, the deformable element 16 linked to the fixed frame at points 17 is submitted to a dragging action and passes from a configuration of minimum extension shown in FIG. 5 to a configuration of maximum extension shown in FIG. 4.

In particular moving of the intermediate members 19 present on the first movable plate 6 away from those present on the fixed frame 2 involves creation of respective U-shaped undulations of a higher length that therefore give rise to a displacement of belt 16 away from the horizontal intermediate member 22 towards the first free wheel 20 so as to reach the configuration shown in FIG. 4.

During this movement therefore the belt 16 drives the free wheel 20 in rotation, which wheel in turn, being fitted on the shaft of wheel 18, gives rise to a corresponding rotation of the latter that is converted into an advancing movement of the scooter.

During the opposite return movement from the configuration in FIG. 4 to that in FIG. 5, the second movable element 7 (arranged in a mirror image symmetry with respect to the just described element) exactly carries out the same movement, thereby causing belt 16 to be dragged along as shown in FIG. 4 from the first free wheel 20 towards the horizontal intermediate member 22, to the intermediate members present exactly on the second movable element 7.

During this movement, a rotation of the free wheel 21 (opposite to the free wheel 20 with respect to the rear wheel 4) will be caused, said free wheel 21 in turn transmitting the rotatory motion to the back wheel 4 and therefore still causing an advancing movement of scooter 1.

It will be easily understood that the free wheels 20 and 21 are exclusively active during the rotation step in the advancing direction of the scooter and are idle during the opposite movement.

It will be appreciated that application of the present invention is obviously also possible to devices that greatly differentiate from a scooter.

In particular the same pushing device can be applied to vehicles provided with three or more wheels also of much bigger sizes than those of a current scooter (see the illustration in FIG. 3, for example). In addition, the motion-transmitting unit as described represents the preferred embodiment, but it could also be made using a different system for converting the reciprocating motion defined by the two plates into a corresponding rotatory motion of the rear wheel.

The invention achieves important advantages.

First of all the present invention, depending on requirements, allows use as a scooter to be pushed in a traditional manner for example at the starting moment and to be pushed by means of levers in order to maintain or increase speed.

The vehicle allows speeds comparable with those of a normal bicycle to be maintained for a long period of time under conditions of great steadiness of the vehicle in use.

The particular positioning of the movable plates enables the rider to maintain a correct position on the scooter and also to drive it in a comfortable manner and with a reduced effort.

In fact, due to the presence of two movable levers, the necessary travels to ensure an optimal advancing of the vehicle can be halved; selecting an upward end-of-stroke position the travel of which is not very long allows the rider's effort to be minimised; in fact the rider is able to drive the device of the invention by lateral displacements of his/her weight and small variations in the height of his/her legs and feet.

Finally the rider can maintain his/her rest position by lying both feet on the two plates keeping the latter to the same height, which further increases comfort in use.

In particular, by adopting two separated pushing plates distinct from each other the rider's movements are made easier and the foot-rest surfaces are disposed much closer to each other.

The invention claimed is:

1. A scooter comprising:
   a base frame (2) having an upper surface;
   a first and a second wheel (3, 4) in engagement with the base frame (2) to allow movement of the scooter;
   a motion-transmitting unit (8) associated with the base frame (2) to drive at least one of said wheels (3, 4);
   at least one first and one second plate (6, 7) separated from each other, superposed to the upper surface of the base frame (2) and movable in reciprocating manner between a point of minimum distance from the upper surface of the base frame (2) and a point of maximum distance from the upper surface of the base frame (2), said first and second movable plates (6, 7) being active on the motion-transmitting unit (8) to allow at least one of said wheels (3, 4) to be driven into rotation whereby enabling the scooter movement, the motion-transmitting unit (8) converting a reciprocating motion of the movable plates (6, 7) into a rotatory motion applied to the second wheel (4) and comprising at least one deformable element (16) directly in engagement with the first and second movable plates (6, 7) and also active on two free-wheels (20, 21) to transfer the motion received through the deformable element (16) to the second wheel (4) in an alternated matter;
   means (12) for synchronizing motion of said first and second movable plates (6, 7) comprising a fixed structure (13) emerging away from the upper surface of the base frame (2) and a deformable body (14), other than said deformable element (16), which is movable on the fixed structure (13) and is in engagement at its opposite ends with said first and second movable plate (6, 7), wherein the first and the second movable plates (6, 7) are hinged on the base frame (2) at a front region (1a) of the scooter in correspondence of a steering member (5) and are defined by elongated plates disposed in mutual side by side relationship along a longitudinal vehicle axis (10), so as to exactly define a support surface designed to receive a rider's respective feet, so as a rider can stand on the scooter keeping legs and feet closed to each other in side by side relationship.

2. A scooter as claimed in claim 1, further comprising a roller (15) idly mounted on the fixed structure (13), the deformable body (14) running over said roller (15).

3. A scooter as claimed in claim 1, further comprising a steering member (5) active on a front wheel, to allow the scooter to travel over curved paths.

4. A scooter as claimed in claim 1, wherein the motion-transmitting unit (8) further comprises a predetermined number of intermediate members (19) mounted to the movable plates (6, 7) and the base frame (2), the deformable element (16) being movable on an intermediate member (19).

5. A scooter as claimed in claim 4, wherein the motion-transmitting unit (8) comprises at least one intermediate member (19) for each movable plate (6, 7) and at least one intermediate member (19) corresponding to each movable plate (6, 7) on the base frame (2), a movement away from the base frame (2) by the first movable plate (6) causing dragging along of part of the deformable element (16) from the second movable plate (7) to the first movable plate (6) and driving in rotation of a free wheel (20) and consequently of the second wheel (4), a movement away from the base frame (2) by the second movable plate (7) causing a corresponding dragging along of part of the deformable element (16) from the first movable plate (6) to the second movable plate (7) and driving in rotation of a second free wheel (21) and consequently of the second wheel (4).

6. A scooter as claimed in claim 4, wherein the motion-transmitting unit (8) comprises a further intermediate member (22) to allow movement of the deformable element (16) between the first and second movable plates (6, 7).

7. A scooter comprising:
a base frame (2);
a first and a second wheel (3, 4) in engagement with the base frame (2) to allow movement of the vehicle;
a motion-transmitting unit (8) associated with the base frame (2) to drive at least one of said wheels (3, 4), a deformable body (14) which movable of a fixed structure (13);
at least one first and one second plate (6, 7) separated from each other and movable with respect to the base frame (2), said first and second movable plates (6, 7) being active on the motion-transmitting unit (8) to allow at least one of said wheels (3, 4) to be driven in rotation thereby enabling movement of the vehicle, said first and second movable plates (6, 7) defining respective actuating surfaces arranged substantially in side by side relationship with each other with respect to a longitudinal extension axis (10) of the vehicle, the actuating surfaces being shiftable by a rider with a reciprocating motion, the motion-transmitting unit comprising a deformable element (16) in engagement with first and second movable plates (6, 7) and further comprising two free-wheels (20, 21), the deformable element (16) causing a rotation of said two free-wheels (20, 21), said free-wheels (20, 21) in turn transmitting a rotatory motion to said wheel (4).

8. A scooter according to claim 7, wherein the base frame (2) comprises an upper horizontal wall, two lateral walls and two bottom walls to define a containing space, the two free-wheels (20, 21) being placed inside said containing space.

* * * * *